United States Patent [19]

Wieland et al.

[11] Patent Number: 4,680,862
[45] Date of Patent: Jul. 21, 1987

[54] MOTOR-DRIVEN CHAIN SAW

[75] Inventors: Dieter Wieland, Remseck; Abou Aly, Waiblingen; Hartmut Riess, Weinstadt, all of Fed. Rep. of Germany

[73] Assignee: Andreas Stihl, Waiblingen, Fed. Rep. of Germany

[21] Appl. No.: 900,746

[22] Filed: Aug. 27, 1986

[30] Foreign Application Priority Data

Aug. 28, 1985 [DE] Fed. Rep. of Germany ....... 3530685

[51] Int. Cl.⁴ ............................................. B27B 17/02
[52] U.S. Cl. .................................. 30/381; 83/DIG. 1
[58] Field of Search ................. 30/383, 382, 384, 385, 30/381; 83/DIG. 1

[56] References Cited

U.S. PATENT DOCUMENTS

| | | | |
|---|---|---|---|
| 4,152,833 | 5/1979 | Phillips | 30/382 |
| 4,362,196 | 12/1982 | Ferdinand | 83/DIG. 1 |
| 4,370,810 | 2/1983 | Schurr | 30/382 |
| 4,432,139 | 2/1984 | Kohler | 30/381 |
| 4,543,723 | 10/1985 | Bortfeld | 30/381 |
| 4,573,556 | 3/1986 | Andreasson | 30/382 |
| 4,625,406 | 12/1986 | Fushiya et al. | 30/381 |

Primary Examiner—Jimmy C. Peters
Attorney, Agent, or Firm—Walter Ottesen

[57] ABSTRACT

A motor-driven chain saw is electrically operated by means of a universal motor and has two brake systems operating independently of one another. A mechanical brake system serves as a safety brake and when actuated, the mechanical brake system brings the saw chain to a standstill instantaneously. The second brake system is an electric coasting brake, which when the switch is released stops the saw chain quickly but without recoil. The electrical braking is effected by reversing the polarity of one pole coil of the field winding and short-circuiting it with the rotor winding.

7 Claims, 6 Drawing Figures

MOTOR-DRIVEN CHAIN SAW

FIELD OF THE INVENTION

The invention relates to a motor-driven chain saw having an electric series motor, in particular a universal motor, which has a field winding including at least two pole coils and at least one rotor winding. During operation, these windings are connected in series and can be applied to a supply voltage by actuating at least one switch. The motor also has a mechanical safety brake.

BACKGROUND OF THE INVENTION

Chain saws of the above-mentioned type must have a safety brake in order to meet safety regulations for the prevention of injuries. In the event of dangerous situations such as kickback, this brake must respond and bring the saw chain to a standstill virtually instantaneously. In known motor-driven chain saws of this type, this is accomplished by providing a mechanical brake, which in the event of a dangerous condition, is automatically triggered by the kickback of the chain saw or by slippage of the operator's hand toward the saw chain guide bar.

A disadvantage of known tools of this kind is that the saw chain coasts to a stop without braking if the operating switch is released. This means that if there is a normal interruption in operation, the saw chain can continue to revolve after the tool has been set down, because the unbraked rundown time lasts between 3 and 6 seconds. This presents considerable risk of injury. The still-revolving saw chain, after the tool has been set down, can come into contact with objects that will be spun about by the kinetic energy of the saw chain or will set the tool itself in motion. This can cause unforeseen injuries, especially because the operator tends not to pay as much attention to the tool after he has shut it off and thus underestimates the danger of the still-revolving saw chain.

SUMMARY OF THE INVENTION

It is an object of the invention to provide a chain saw of this type in which operational safety and especially braking safety are increased, and in which the saw chain will come to a stop quickly, but without jerking, when the operating switch is released.

According to a feature of the invention, an electric coasting brake is additionally provided which effects a quick but non-jerking braking of the saw chain when the operating switch is released. The operational safety of the tool is thereby increased, because after the switch is released the saw chain comes to a standstill so quickly as to preclude injury to the operator; yet on the other hand, the electrically effected braking is gradual enough that the resultant recoiling moments have no perceptible influence on the tool and will no longer move the tool even after the tool has been set down on the ground.

Since the motor-driven chain saw according to the invention has not only the electric coasting brake but a mechanical safety brake as well, which when activated brings the saw chain to a stop almost instantaneously, it is sufficient for the electric coasting brake to have lower deceleration values, since safety during operation is already assured by the fast-acting mechanical brake. For safety when the tool is being shut off, this slower braking speed is adequate; in fact, it is particularly advantageous because it effects a non-jerking braking of the saw chain.

This non-jerking yet rapid braking by the electric coasting brake is accomplished as follows: when the switch is released, the drive motor is disconnected from the supply voltage; at the same time, in accordance with a feature of the invention, only one pole coil of the two pole coils of the field winding has its polarity reversed and is short-circuited by the rotor winding. The result is the favorable braking behavior described above. This puts virtually no strain on the motor, or more specifically on the electrical contacts in the motor and switch, because when only one coil is short-circuited, the short-circuit currents that arise are relatively low. This has a favorable effect on the service life of the switch and the carbon brushes, which despite their additional function as a coasting brake are not subjected to notably greater wear.

Furthermore, the electric coasting brake is inexpensive to manufacture, because essentially all that has to be provided is an appropriate embodiment of the switch and the associated motor connections. The operational safety thereby attained is markedly greater than in known motor-driven chain saws of this type, because even if one brake fails the other brake still remains operationally ready, which further increases the safety of the tool.

In an advantageous embodiment of the invention, the switch for switching the tool on and off, by which the electric coasting brake is actuated when the tool is shut off, is embodied as a pole changing trigger switch, so that when it is released, the saw chain is braked automatically. The trigger switch can be mounted in the form of an operating switch in the handle, as is typically done with tools of this type. An electronic speed controller can also be provided, and the switch function described above is then actuated only in the end position of the switching function described.

According to an advantageous embodiment of the invention, a motor-driven chain saw having two handles is provided with a switch mounted in each handle and a circuit connects the switches in such a way that the saw chain is driven only when both switches are actuated, while if even one of the switches is released, the electrical coasting brake is activated. This further increases safety for the operator, because the chain saw can be operated only when both hands are firmly in contact with the guide handles for holding the chain saw and when both switches are actuated. When one or both switches are released, the saw chain is braked automatically, so that with this circuit arrangement the electric coasting brake additionally reinforces the mechanical safety brake, for example, when one of the operator's hands slips off the guide handle because of a kickback of the chain saw.

BRIEF DESCRIPTION OF THE DRAWING

The invention will now be described with reference to the drawing wherein.

DESCRIPTION OF THE PREFERRED EMBODIMENTS OF THE INVENTION

Figure 1:
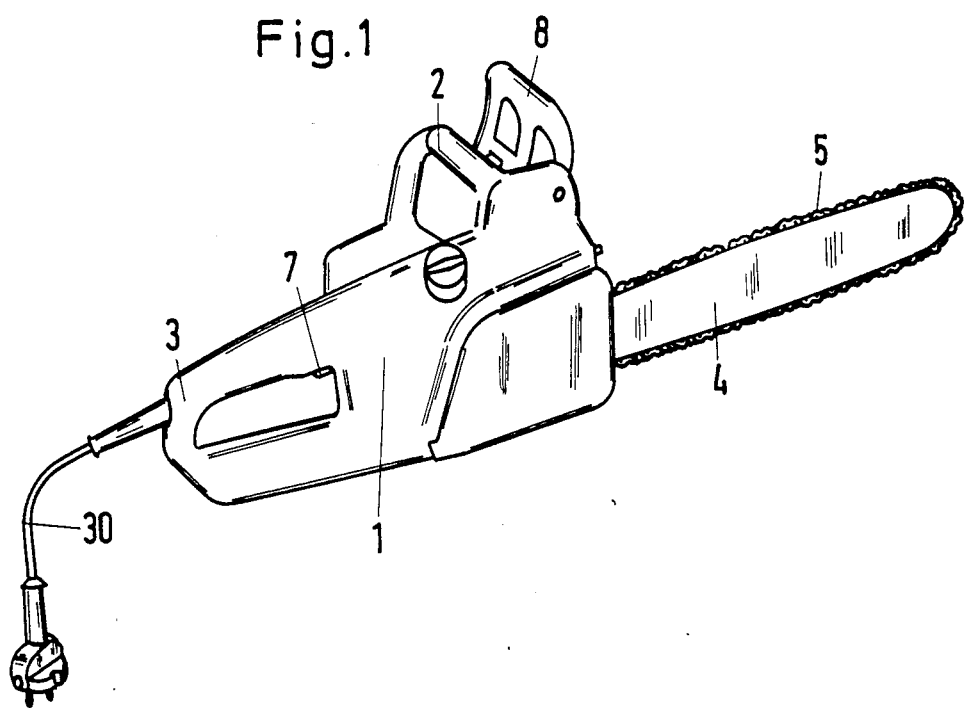
FIG. 1 is a perspective view of a motor-driven chain saw according to the invention.
Figure 2:
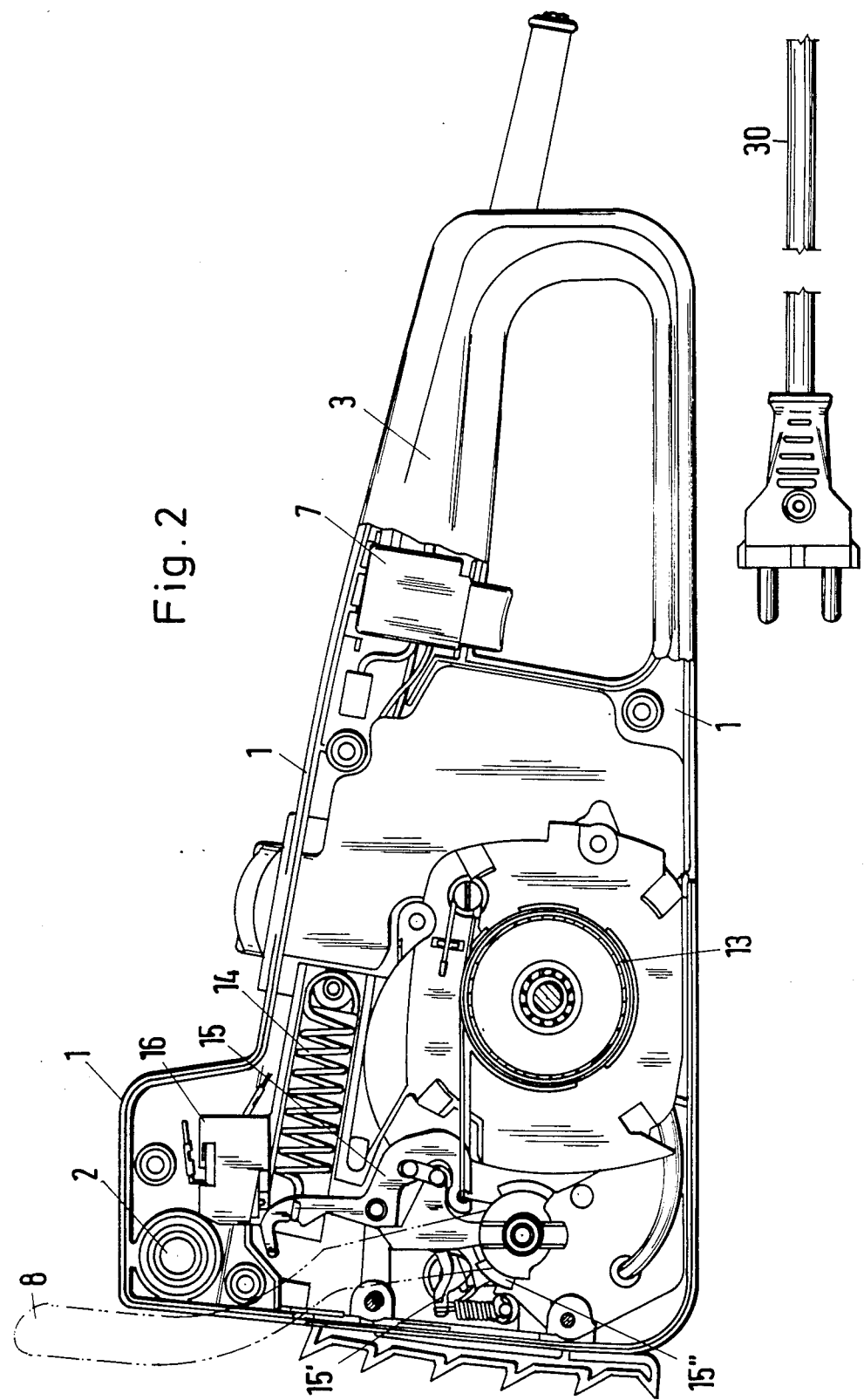
FIG. 2, on a larger scale, is a vertical longitudinal section taken through the power head of the motor-driven chain saw of FIG. 1.
Figure 3:
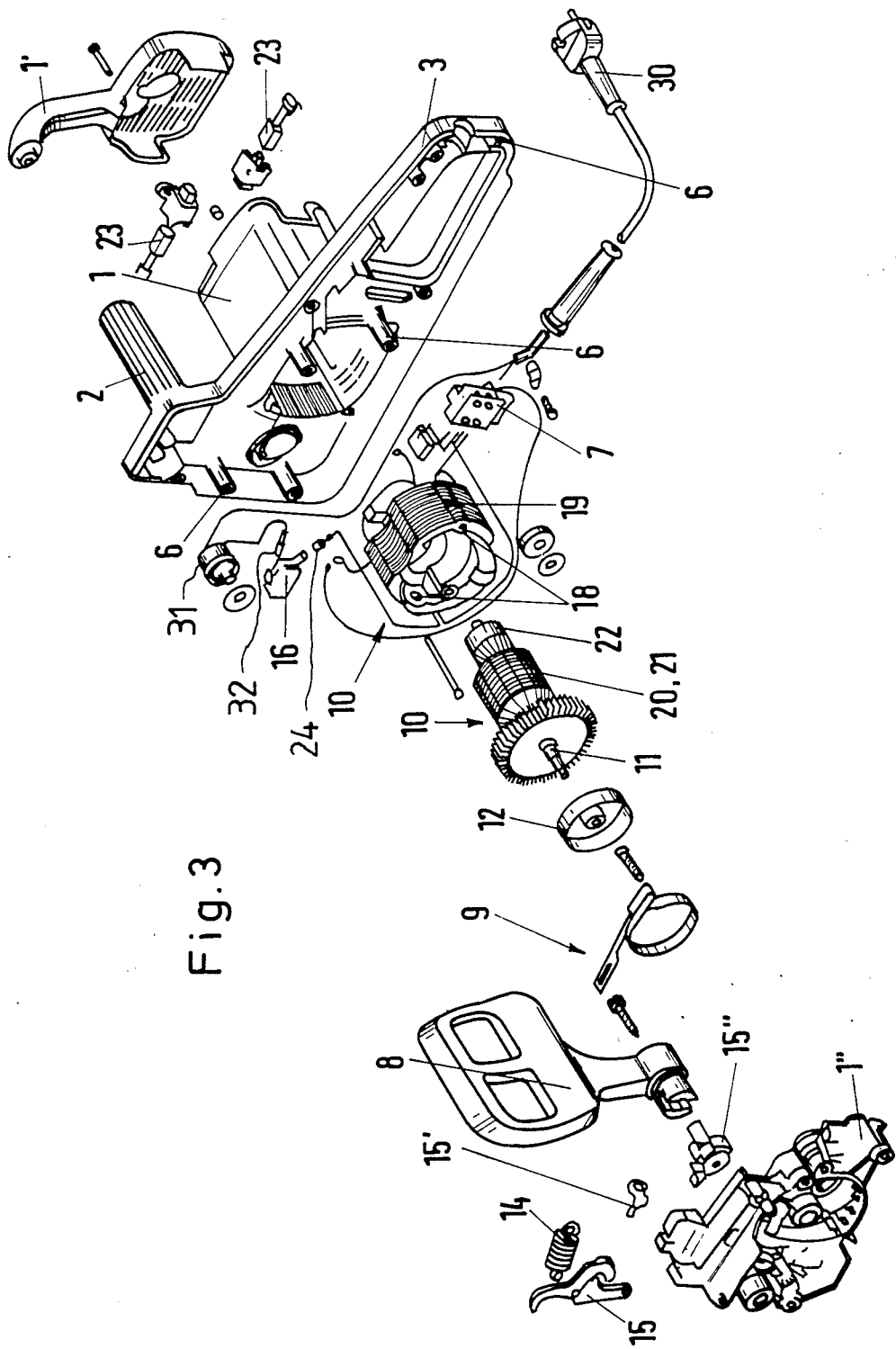
FIG. 3 is an exploded view showing the arrangement of the motor, the mechanical safety brake and the wiring of the electrical safety brake.

The chain saw shown in the drawing is an electrically operated motor-driven chain saw having a universal motor. The chain saw has a housing 1 and a guide bar 4 extending from the front end of the housing. A saw chain 5 is mounted on and guided around the guide bar. The guide bar 4 is disposed parallel to the longitudinal central plane of the chain saw which is located approximately in the partition plane 6 of the housing 1 shown in FIG. 3. A front handle 2 is transversely mounted near the top of the housing. The rear portion of the housing 1 defines a rear handle 3 located approximately in the longitudinal central plane 6 of the chain saw. An electric switch 7 for actuating the chain saw is disposed in the rear handle 3. The connection cable 30 for supplying electric current extends from the back of the housing 1, at the end of the rear handle 3. In front of the front handle 2, there is a hand guard 8, which extends beyond the handle 2 both upward and downward and by means of which the mechanical safety brake 9 inside the tool can be actuated.

The electric drive motor 10 is mounted inside the housing 1, approximately underneath the front handle 2, and its drive shaft 11 is disposed transversely to the longitudinal central plane 6 of the chain saw. The drive shaft 11 of the motor 10 drives the saw chain 5 via a sprocket wheel (not shown) disposed on the housing 1 where the guide bar 4 is mounted. As shown in the exploded view of FIG. 3, the brake drum 12 of the mechanical safety brake 9 is mounted on the drive shaft 11.

The mechanical safety brake 9 is configured in this embodiment as a band brake and if the hand guard 8 is pressed forward, it effects automatic braking by means of a spring-loaded band brake, in the course of which a brake band 13 is wrapped about the brake drum 12 mounted on the drive shaft 11. The hand guard 8 is connected via a bell crank 15 to the brake band 13 biased by the spring 14. The hand guard 8 trips whenever a predetermined force is applied thereto. When the mechanical safety brake 9 is tripped, the bell crank 15 actuates a microswitch 16, which interrupts the supply of current to the motor, so that the safety brake does not have to work against a running motor 10.

During operation, the mechanical safety brake 9 is tripped by the hand guard 8, for example, in response to a kickback of the chain saw or if the operator's hand slips off the front handle 2 and is caught by the hand guard 8, so that the brake is triggered practically automatically. The mechanical safety brake 9 is a fast-acting brake which brings the saw chain to a standstill in preferably less than 150 milliseconds; this is done by shutting off the supply of current to the chain saw and tightening the brake band 13 around the brake drum 12.

The electric coasting brake 17 (see FIG. 5) substantially comprises the motor 10 and the switch 7, along with the appropriate wiring. The motor 10 is a series motor, in this embodiment a universal motor, which in the usual manner has a field winding 18, comprising two pole coils 18' and 18", which are carried by the stator 19 mounted in the housing 1. The rotor 20 is mounted on the shaft 11 and is rotatably supported inside the stator 19. The rotor 20 has slots in which the self-contained rotor winding 21 is embedded; the rotor winding 21 is connected to a commutator 22, which is also mounted on the shaft 11. The electrical connection between the rotor winding 21 and the field winding 18 is effected by means of carbon brushes 23, which are in contact with the commutator 22.

Figure 4:
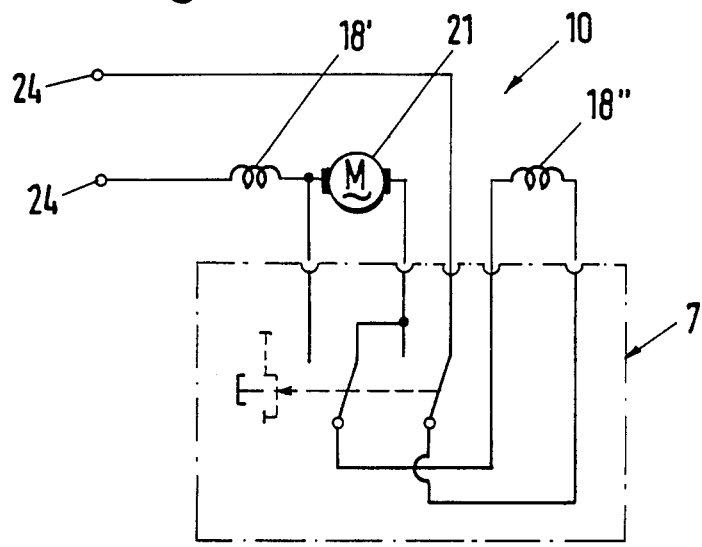
FIG. 4 is a circuit diagram of the motor-driven chain saw according to the invention in its operating position.

FIG. 4 shows the circuit configuration of the motor 10 and of the switch 7 when in the operating position, that is, when the switch 7, configured as a trigger switch, is actuated by the operator and the saw chain 5 is driven by the motor 10. The switch 7 is configured as a two-pole switch in this embodiment; the trigger is subjected to a force, for example by means of a spring, so that when it is no longer depressed, it is automatically moved from the position shown in FIG. 4 to the position shown in FIG. 5. In the operating position (FIG. 4), the field winding, comprising the pole coils 18' and 18", and the rotor winding 21 are connected in series; the supply voltage is applied to the terminals 24. This switching position is well known and requires no further explanation here; the current flows through one pole coil 18', the rotor winding 21 and the other pole coil 18", or vice versa. It should be noted that the microswitch 16 (FIG. 3), which upon actuation of the mechanical safety brake 9 interrupts the supply of current, is located between one of the terminals 24 and the connection cable 30 and is connected into the supply circuit by means of terminals 24 and 32 also shown in FIG. 3. Reference numeral 31 in FIG. 3 identifies an overload protective device in the form of a bimetal switch.

Figure 5:
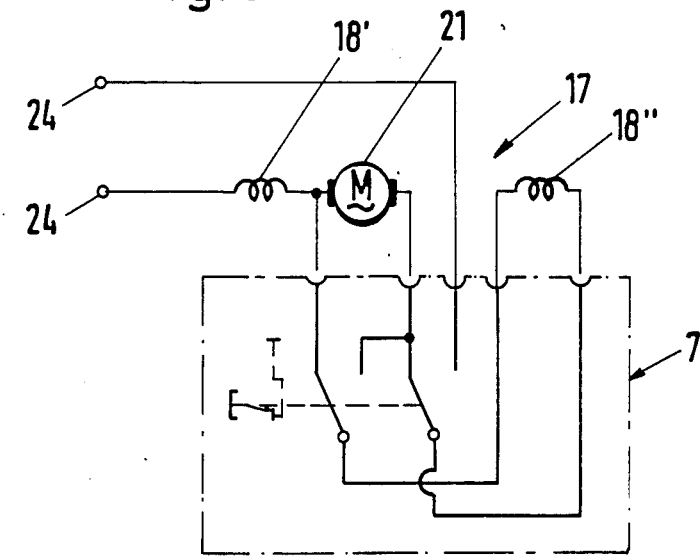
FIG. 5 is a circuit diagram of the chain saw of FIG. 4 in the braking position; and, FIG. 6 is a circuit diagram of the motor-driven chain saw of the invention showing the two switches in their closed position.

FIG. 5 shows the circuit configuration in the braking position, that is, in the form of the coasting brake 17, which is switched on upon nonactuation or release of the trigger switch 7. The trigger switch 7, as it jumps back to its start position, interrupts a line leading to a terminal 24, so that a supply voltage is no longer applied to the motor 10. One of the pole coils, in this embodiment the pole coil 18', has its polarity reversed and is short-circuited with the rotor winding 21 of the motor 10 by means of the trigger switch 7. The other pole coil 18' remains unswitched at this time. By changing the polarity of the pole coil 18" and short-circuiting it with the rotor winding 21, with the motor 10 still running, a torque is produced which counteracts the original torque present in the operating position (FIG. 4) of the motor 10. As a result, the rotor 20 is braked, causing the saw chain 5 to come to a standstill. As already mentioned above, the fact that only one pole coil has its polarity reversed and is short-circuited leads to the advantageous braking action. Hard braking is thereby avoided, wear on the carbon brushes and switch contacts is kept low, and the recoil torque on the chain saw that would result from hard braking is largely prevented. Nevertheless, the electric coasting brake 17 (FIG. 5) described here operates so quickly that the danger of injury from the saw chain 5 as it coasts to a stop is avoided.

In the circuit layout of FIG. 5, it is unimportant which of the pole coils 18' or 18" has its polarity reversed and is short-circuited; this circuit configuration can also be used in motors having more than two pole coils. Nor is the embodiment restricted to a universal motor; in principle, any series motor can be wired in this way.

Figure 6:
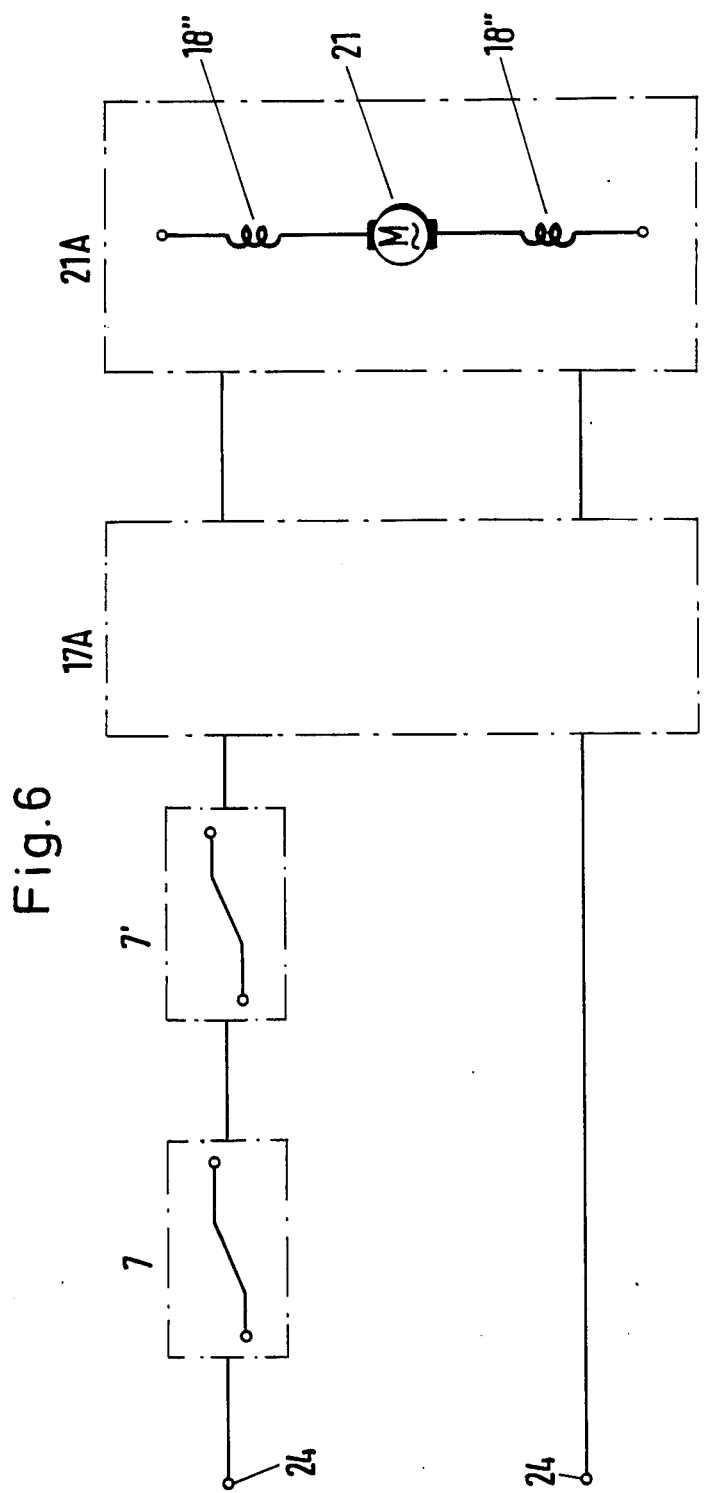

To increase safety still further, an additional trigger switches 7' can be provided as shown in FIG. 6 and which can be mounted in the handle 2.

In the block diagram of FIG. 6, the motor 21 with its pole coils 18' and 18" and the control unit which constitutes the electrical coasting brake 17 are shown as respective blocks 21A and 17A. The two trigger switches 7 and 7' are also shown as blocks and are connected in series. For this reason, the coasting brake is ineffective as long as both trigger switches 7 and 7' are depressed. If both trigger switches 7 and 7' or only one trigger switch is released, the coasting brake is switched in and activated.

In the embodiment described above, a band brake is used as the mechanical safety brake 9, but it will be understood that any suitable mechanical brake may be used. The described combination of a mechanical safety brake 9 and an electric coasting brake 17 is particularly advantageous, because the production costs for the chain saw according to the invention, having two independent brakes, are approximately the same as those for chain saws having only a mechanical brake, yet considerably greater operational safety is afforded by the chain saw according to the invention.

It is understood that the foregoing description is that of the preferred embodiments of the invention and that various changes and modifications may be made thereto without departing from the spirit and scope of the invention as defined in the appended claims.

What is claimed is:

1. A motor-driven chain saw comprising:
   a housing;
   a guide bar mounted on said housing for accommodating a saw chain thereon;
   an electric series motor mounted in said housing for driving the saw chain, the series motor including a rotor winding and a field winding having at least two pole coils;
   current supply means for supplying current to said series motor; and,
   switching circuit means movable between a first position for connecting said rotor winding and said pole coils in series to said current supply means and a second position for disconnecting said supply means from said motor and reversing the polarity of one of said pole coils and short-circuiting said one pole coil across said rotor winding thereby developing a counter torque for braking the coasting movement of the saw chain.

2. The motor-driven chain saw of claim 1, comprising mechanical safety brake means for mechanically braking said saw chain.

3. The motor-driven chain saw of claim 2, comprising ancillary switching means operatively connected to said safety brake means for interrupting the flow of supply current to said motor when said safety brake means is actuated.

4. The motor-driven chain saw of claim 1, said switching circuit means including a two-pole trigger switch.

5. The motor-driven chain saw of claim 1, comprising a first handle mounted on said housing and a second handle mounted on said housing in spaced relationship to said first handle, said switching circuit means including two trigger switches mounted in corresponding ones of said handles and connected in series with each other; and, control circuit means responsive to the actuation of only one of said switches for disconnecting said supply means from said motor and reversing the polarity of one of said pole coils and short-circuiting said one pole coil across said rotor winding thereby developing a counter torque for braking the coasting movement of the saw chain.

6. The motor-driven chain saw of claim 1, said series motor being a universal motor.

7. A motor-driven chain saw comprising:
   a housing;
   a guide bar mounted on said housing for accommodating a saw chain thereon;
   an electric series motor mounted in said housing for driving the saw chain, the series motor including a rotor winding and a field winding having at least two pole coils;
   current supply means for supplying current to said series motor; and,
   switching circuit means movable between a first position for connecting said rotor winding and said pole coils in series to said current supply means and a second position for disconnecting said supply means from said motor and reversing the polarity of said rotor winding and short-circuiting said field winding across said rotor winding thereby developing a counter torque for braking the coasting movement of the saw chain.

* * * * *

UNITED STATES PATENT AND TRADEMARK OFFICE
CERTIFICATE OF CORRECTION

PATENT NO. : 4,680,862

DATED : July 21, 1987

INVENTOR(S) : Dieter Wieland, Abou Aly and Hartmut Rieß

It is certified that error appears in the above-identified patent and that said Letters Patent is hereby corrected as shown below:

In column 4, line 44: delete "coil 18'," and substitute -- coil 18", -- therefor.

In column 5, line 4: delete "switches 7'" and substitute -- switch 7' -- therefor.

Signed and Sealed this

Fifth Day of January, 1988

Attest:

DONALD J. QUIGG

Attesting Officer

Commissioner of Patents and Trademarks